Patented May 27, 1930

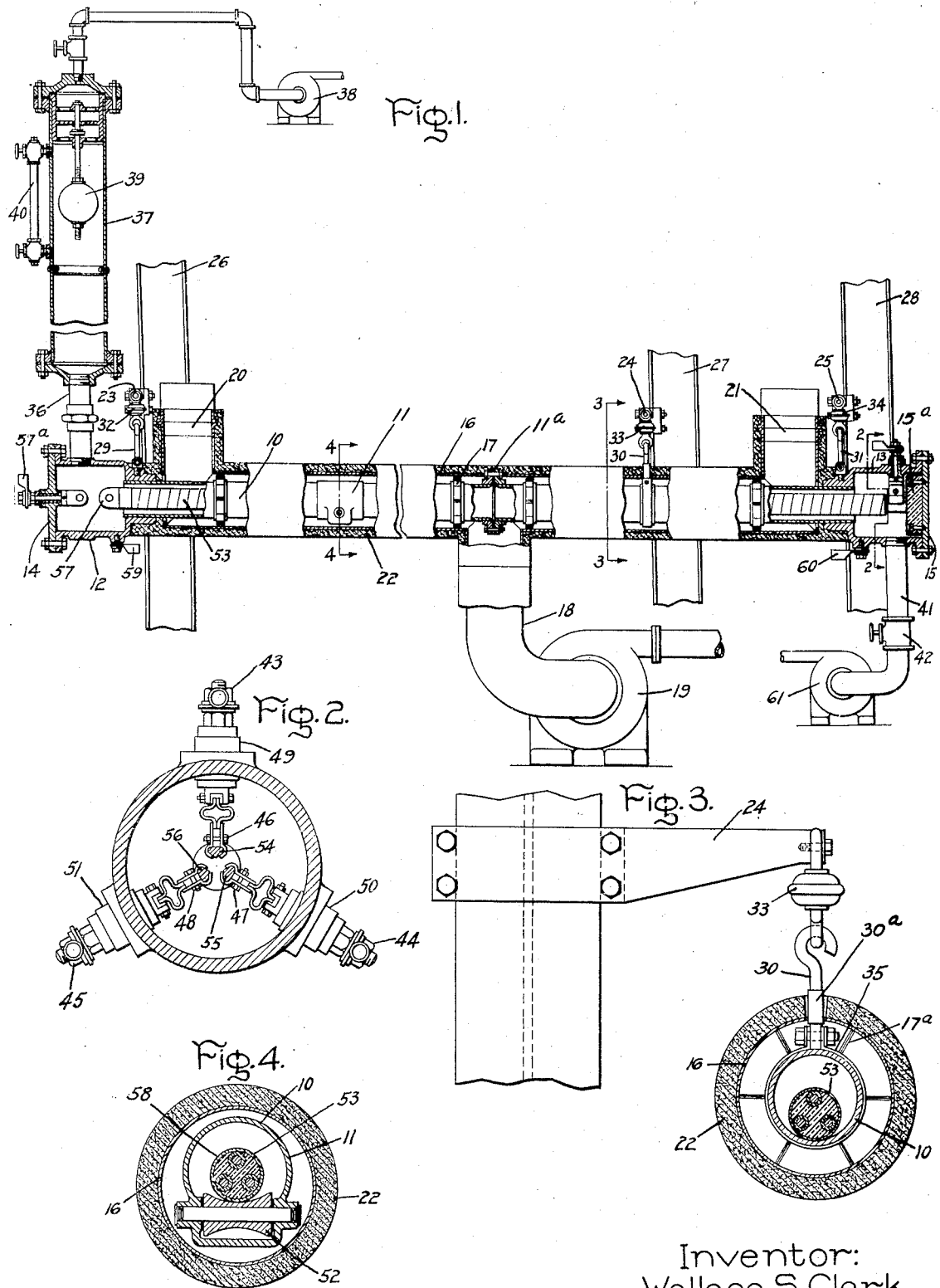

1,760,583

UNITED STATES PATENT OFFICE

WALLACE S. CLARK, OF SCHENECTADY, NEW YORK, ASSIGNOR TO GENERAL ELECTRIC COMPANY, A CORPORATION OF NEW YORK

METHOD AND APPARATUS FOR TREATING INSULATED CONDUCTORS

Application filed March 23, 1926. Serial No. 96,888.

My invention relates to the treatment of insulated conductors and has for its object the provision of a simple, reliable and efficient method and apparatus for treating insulated conductors.

More specifically my invention relates to the treatment of insulated electrical conducting cables of various kinds, such for example, as are used for telephone lines, high tension underground transmission lines, etc. These cables comprise one or more electric conductors covered with suitable insulating material, such as paper, often with an outer protecting armor such as a lead sheath. Before the lead sheath is applied, the cable is usually impregnated with a suitable insulating material in connection with a vacuum or other process whereby the moisture is removed. It has heretofore been the custom in carrying out the impregnating process to wind the cable upon a reel, the reel being placed in a closed heated container from which the air is exhausted, and after the cable has been dried the impregnating material is admitted to the container.

In carrying out my invention, I impregnate the cable in an elongated container of substantially the same length as the cable.

For a more complete understanding of my invention reference should be had to the accompanying drawing in which Fig. 1 is a fragmentary elevation view partially in section of apparatus for impregnating cables embodying my invention; Fig. 2 is an enlarged sectional view along the line 2—2 of Fig. 1 looking in the direction of the arrows; Fig. 3 is an enlarged sectional view along the line 3—3 of Fig. 1 looking in the direction of the arrows; while Fig. 4 is an enlarged sectional view along the line 4—4 of Fig. 1 looking in the direction of the arrows.

Referring to the drawing, the impregnating tank or container 10 in one form of my invention is substantially the same length as the section of cable to be treated, for example 500 feet. The container 10 is formed from a plurality of lengths of strong steel pipe joined by couplings 11, welded joints being provided at the couplings to assure tight connections. At the ends respectively of the container 10 are enlarged cylindrical heads 12 and 13 having removable covers 14 and 15 which are secured in place by suitable clamping bolts.

Surrounding the container 10, and of substantially the same length, is a second metal pipe or casing 16 having a considerably larger diameter. This pipe may be made of light sheet metal and it is held in concentric relation with the container 10 by means of a plurality of spacing members 17 placed around the container at suitable intervals. These spacing members consist of metallic or non-metallic rings provided with radially extending vanes 17ª, and the spacing members are electrically insulated from the container 10 so as to insulate the pipe 16 from the container. The pipe 16 is provided at its approximate middle with an opening leading into a pipe 18, extending substantially at right angles therewith, which leads to a suitable air blower or fan 19. Outlet ducts 20 and 21 are provided at each end of the pipe 16. The pipe 16 is provided with an outer jacket of heat insulating material 22.

The container 10 is supported at suitable intervals by means of brackets 23, 24 and 25 which may in turn be secured to a suitable framework or for example to the upright supporting beams 26, 27 and 28 forming a part of the building in which the apparatus is set up. To facilitate assembly, one or more flanged joints 11ª are provided. Preferably a bracket is provided, a shown, at each end of the tank, while there will be a plurality of intermediate brackets 24. The container is hung from the brackets on hooks 29, 30 and 31 which engage respectively with insulating connectors 32, 33 and 34 attached to the brackets. It will be observed that the brackets are of such length that the container is supported out of contact with the uprights 26, 27 and 28, and by means of the insulators 32, 33 and 34 it is thus electrically insulated from all supporting parts. The hooks 29 and 31 may be connected directly to the heads 12 and 13, while the intermediate hooks 30 are secured to the container by means of straps 35 (Fig. 3) passing around the container and preferably insulated from the container. The intermediate hooks 30 extend through apertures provided for them in the casing 15 and are provided with insulating sleeves 30ª whereby they are insulated from casing 16.

The head 12 is connected by way of a pipe 36 and an overflow tank 37 to an air pump 38. A float valve 39 is provided in the upper end of the tank 37 for preventing overflow of impregnating fluid into the pump. A glass gage 40 is provided by means of which the level of the impregnating fluid in the tank can be observed. It will be understood that suitable condensing apparatus not shown, for the moisture in the air may be provided in connection with the pump 38.

From the head 12, the tank slopes downward somewhat toward the opposite end. The head 13 is provided with an inlet pipe 41 for the impregnating fluid, the admission of the impregnating fluid being controlled by means of a valve 42. The head 13 is also provided with three external connectors 43, 44 and 45 (Fig. 2) which are spaced at 120° intervals around the circumference of the head and extend through the wall of the head into the interior thereof where they terminate in suitable connecting clamps 46, 47, and 48. The connectors are mounted in electrical insulators 49, 50 and 51 by means of which they are thoroughly insulated from the head.

As shown in Fig. 4 each of the couplings 11 is provided with a roller 52 on its lower side. This roller is slightly tapered from each end toward the center so as to provide a depression to receive the cable 53 to be treated, the axis of the roller being at right angles to the longitudinal center line of the tank 10.

In using the apparatus the covers 14 and 15 are removed and a length of cable 53 drawn into the tank 10. The cable is supported to a great extent, so that destructive abrasion is prevented by the rollers 52 in the couplings 11, which are placed, for example, at intervals of 20 feet. It will be assumed that the cable is a three-phase multiple conductor cable, it being provided with three insulated conductors 54, 55 and 56 (Fig. 2). The conductors at the end of the container enclosed by the head 12 are electrically connected together temporarily, for example, by means of a connector 57. At their opposite ends the conductors are secured to the connecting clamps 46, 47 and 48 by means of which they are electrically connected to the external connectors 43, 44 and 45. In the event that the cable has a single conductor, only one of the connectors 43, 44 and 45 will be used, and the other end of the conductor will be connected to a connector 57ª similar to connectors 43, 44 and 45 which is secured in the cover 14 in insulated relation therewith. The covers 14 and 15 are secured in place to seal the container and the pump 38 is then started to evacuate the air. The terminals of the connectors 43, 44 and 45 are electrically connected to a suitable three-phase source of supply, not shown, or to the terminals of any other suitable low voltage supply source, and an electric heating current is passed through the conductors 54, 55 and 56 of such value that the conductors are heated and the insulating covering 58 of the conductors heated internally so as to drive off any moisture which it may contain. A plate of insulating material 15ª is secured to the inner side of the cover 15 to prevent accidental contact between the conductors of the cable and the cover. At the same time an electric heating current is passed through the wall of the container 10 by means of connectors 59 and 60 leading to a suitable low voltage source of supply. The heat generated in the wall of the container 10 serves to heat the cable externally and therefore the cable insulation is both externally and internally heated. The temperature of the conductors may be determined by the resistance method, the resistance of the conductors being taken when cold and this resistance compared with the hot resistance, in a well-known manner. The temperature of the wall of the container itself may also be determined in this manner, and by regulating the temperature of the two sources of heat, the degree of heat to which the insulating covering is subjected is kept within safe limits so as not to destroy the insulation.

After the moisture has been thoroughly removed from the insulating covering, a suitable impregnating material, such as transformer oil, heavy petroleum products or a mixture of the latter and other substances, such as rosin, is admitted by opening the valve 42, the vacuum in the tank drawing the impregnating material into it. If desired the pump 38 may be kept in operation. In any case the impregnating material is prevented from overflowing into the pump 38 by means of the float valve 39. When sufficient impregnating material has been admitted to be visible in the glass 46, the valve 42 is closed. The impregnating material will be allowed to remain in the tank for a sufficient length of time, as determined by experiment, to assure thorough impregnation of the insulating covering of the cable. To further assure the thorough penetration of the impregnating material, pressure is applied to the impregnating material by means of the pump 61 connected to the inlet pipe 41. At the same time electric currents will be passed through the conductors and the wall of the tank, in order to maintain a desired temperature.

After the cable has been impregnated, the generation of heat is stopped by interrupting the heating circuits through the conductors and the wall of the tank 10. The blower 19 is then started and a current of cooling air caused to circulate through the space between the container 10 and the outer pipe 16 by means of which the container and its contents will be cooled. The cable is thus maintained in the path of impregnating material during the cooling operation so that voids due to shrinkage of the material within the insulating covering of the cable are avoided. After the temperature of the cable has been reduced as desired which may be determined by the resistance method, the excess impregnating material is drained off, the covers 14 and 15 removed, and the cable pulled out and run through a lead press by means of which the outer protecting sheath of lead is applied, or the cable may be run directly from the tank to the lead press.

By means of this process it will be observed that the insulating covering of the cable is heated uniformly throughout the length of the cable, and heat is applied internally as well as externally so that the inner and outer portions of the insulating covering are uniformly heated. This is in distinct advantage over methods heretofore used in which the cable is wound on a reel during the impregnating process. With the cable thus wound on a reel, it is extremely difficult, if not impossible, to heat the insulating covering uniformly. If current is passed through the conductors to heat the covering internally, the portions of the cable in the interior of the coil will be heated more rapidly than the exterior portions with the result that the insulation in these interior portions may be overheated and damaged. Conversely, if an external source of heat only is used it is difficult as well as tedious to heat the interior portions of the coil. Furthermore, with all portions of the cable insulation exposed, complete removal of the moisture is assured and also a thorough impregnation. Even with the vacuum method it is extremely difficult to remove all moisture from the coiled cable and also difficult to force the impregnating material into the interior of the coil even when the material is forced in under pressure. The great strength of the container obtained by its elongated construction makes it possible to apply very high pressures to the impregnating compound, such as four or five hundred pounds per square inch. This further assures thorough impregnation.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. The method of impregnating covered electric conductors wherein an elongated container is provided, which consists in placing the conductor lengthwise in said container, passing an electric current through the container from one end to the other to heat the container and thereby heat the conductor, exhausting the air and other gases from said container, and then admitting an impregnating material to said container.

2. The method of impregnating covered electric conductors wherein an elongated container of substantially the same length as the conductor is provided, which consists in placing the conductor lengthwise in said container, passing an electric current through the conductor to heat the covering internally, passing a current through the container to heat the covering externally, exhausting the air from said container, filling said container with an impregnating material under pressure, and then cooling the impregnating material and conductor in said container.

3. The method of impregnating covered electric conductors wherein an air-tight elongated container is provided, which consists in drawing the conductor lengthwise into said air-tight elongated container, passing an electric current through the conductor to heat the covering internally, passing an electric current through the container from one end to the other to heat the container and thereby heat the covering externally, reducing the gas pressure in the container while continuing the heating, and then filling said chamber with an impregnating compound.

4. The method of impregnating covered electric conductors wherein an elongated container of substantially the same length as the conductor is provided, which consists in placing the conductor in said container, passing an electric current through the conductor to heat the covering internally, passing an electric current through the container to heat the covering externally, reducing the gas pressure in said container, filling said container with an impregnating material under pressure, circulating cooling air around said container to cool the impregnating material and conductor and then removing the conductor from said container.

5. Apparatus for impregating insulated cables comprising an elongated container into which the cable is drawn endwise, means for exhausting the air from said container, means for passing an electric current through the conductor to heat the insulating covering internally, means for passing a current through the container to heat the covering externally, means for admitting impregnating material to said container, and means for applying pressure to said impregnating material.

6. Apparatus for impregnating insulated cables comprising an elongated container, means for exhausting the air from said container, means for passing an electric current through the conductor to heat the covering internally, means for passing an electric current through the container to heat the covering externally, means for admitting an impregnating material to said container, and means for cooling said container.

7. Apparatus for impregnating insulated cables comprising an elongated tubular airtight container into which the cable is drawn endwise, means for connecting the cable with an external electrical supply source, means for connecting the ends of said container to the terminals of an electrical supply source, a casing surrounding said container in spaced relation therewith, and means for producing a current of cooling gas in the space between said container and said casing.

In witness whereof I have hereunto set my hand this 22nd day of March, 1926.

WALLACE S. CLARK.